United States Patent
Bogues et al.

(10) Patent No.: US 9,041,712 B2
(45) Date of Patent: May 26, 2015

(54) SLICE VIEW

(71) Applicant: Autodesk, Inc., San Rafael, CA (US)

(72) Inventors: Michael A. Bogues, Brighton, MI (US);
Tyler J. Henderson, Oregon City, OR (US); Hans Walter Herzog, Oakland, MI (US); Yun Chen, Novi, MI (US); Shivakumar Sundaram, Tigard, OR (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/338,276

(22) Filed: Jul. 22, 2014

(65) Prior Publication Data

US 2014/0333618 A1 Nov. 13, 2014

Related U.S. Application Data

(63) Continuation of application No. 11/850,534, filed on Sep. 5, 2007, now abandoned.

(51) Int. Cl.
| | |
|---|---|
| *G06T 17/00* | (2006.01) |
| *G06T 19/20* | (2011.01) |
| *G06F 17/50* | (2006.01) |
| *G06T 19/00* | (2011.01) |

(52) U.S. Cl.
CPC ............. *G06T 19/20* (2013.01); *G06F 17/50* (2013.01); *G06F 2217/42* (2013.01); *G06T 19/00* (2013.01); *G06T 2219/008* (2013.01); *G06T 2219/2021* (2013.01); *G06T 2219/2024* (2013.01)

(58) Field of Classification Search
CPC ..... G06F 17/50; G06F 2217/42; G06T 19/00; G06T 2219/008; G06T 2219/2021; G06T 2219/2024
USPC ............ 345/419, 423, 424, 427; 700/182; 382/128, 131, 132; 600/416, 427, 595, 600/407
See application file for complete search history.

(56) References Cited

U.S. PATENT DOCUMENTS

| | | |
|---|---|---|
| 4,879,668 A | 11/1989 | Cline et al. |
| 6,928,314 B1 | 8/2005 | Johnson et al. |
| 2002/0118187 A1 | 8/2002 | Batori et al. |
| 2003/0020717 A1 | 1/2003 | Onodera |
| 2003/0071810 A1* | 4/2003 | Shoov et al. ................ 345/420 |
| 2003/0204285 A1* | 10/2003 | Thomas et al. .............. 700/182 |
| 2003/0204286 A1* | 10/2003 | Thomas et al. .............. 700/182 |
| 2003/0223627 A1 | 12/2003 | Yoshida et al. |
| 2005/0093860 A1 | 5/2005 | Yanagisawa et al. |
| 2005/0168461 A1* | 8/2005 | Acosta et al. ................ 345/419 |
| 2005/0225551 A1 | 10/2005 | Shimizu et al. |
| 2005/0231530 A1* | 10/2005 | Liang et al. .................. 345/619 |
| 2007/0291032 A1* | 12/2007 | Hashima et al. ............. 345/424 |
| 2008/0021882 A1* | 1/2008 | Pu et al. ............................ 707/3 |
| 2008/0246762 A1 | 10/2008 | Ogata et al. |
| 2009/0174714 A1 | 7/2009 | Nagakura et al. |
| 2009/0267940 A1* | 10/2009 | Garg et al. ................... 345/419 |

* cited by examiner

*Primary Examiner* — Jin-Cheng Wang
(74) *Attorney, Agent, or Firm* — Gates & Cooper LLP

(57) ABSTRACT

A method, apparatus, article of manufacture, and computer program product display multiple slices of a three-dimensional body in a computer drawing application. A first view of a 3D body is displayed. One or more slice sketches are defined on the first view. A single slice view of the three dimensional body is displayed. The single slice view simultaneously depicts all of the slices with a zero-depth representation of each slice.

18 Claims, 10 Drawing Sheets

FIG. 1A
(PRIOR ART)
FIG. 1B
(PRIOR ART)
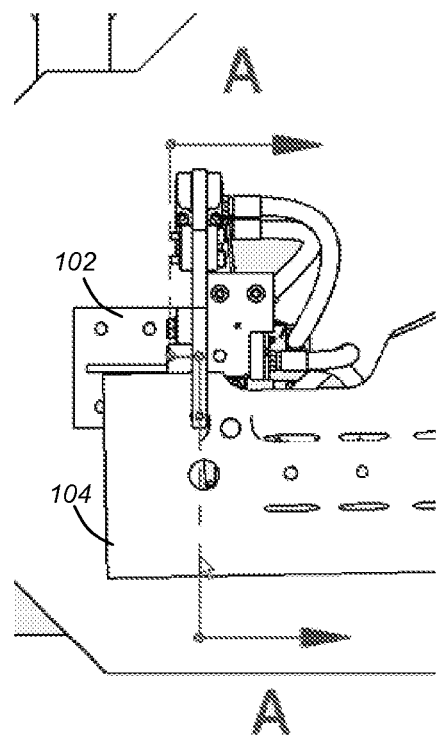
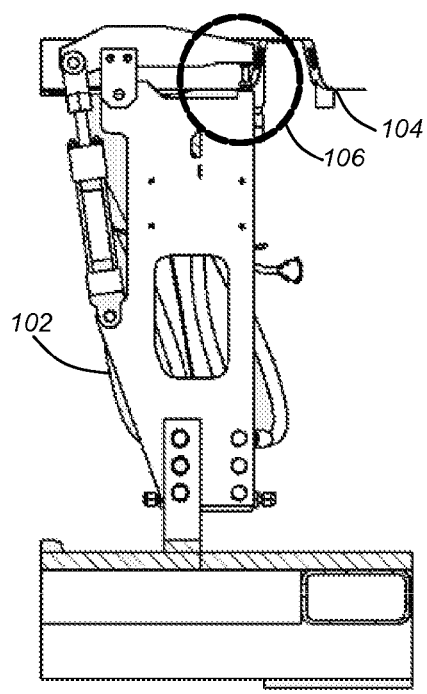

SECTION A-A
SCALE 1 / 4

802A 802B 802C 802D 802E 802F 802G 802A 802B 802C 802D 802E 802F 802G

SLICE VIEW

CROSS-REFERENCE TO RELATED APPLICATIONS

This application is a continuation under 35 U.S.C. §120 of application Ser. No. 11/850,534, filed on Sep. 5, 2007, by Michael Bogues, Tyler J. Henderson, Hans Walter Herzog, Yun Chen, and Shivakumar Sundaram, entitled "SLICE VIEW," which application is incorporated by reference herein.

BACKGROUND OF THE INVENTION

1. Field of the Invention

The present invention relates generally to computer aided designs (CAD), and in particular, to a method, apparatus, and article of manufacture for showing portions of drawing views as a "slice" in a computer drawing application.

2. Description of the Related Art

In the design of complex parts, users need the ability to show portions of Drawing Views as a "Slice" or zero-depth section. This is particularly important in industries where companies design machines to handle or interact with other companies' products. When the components have significant curvature, it's difficult to tell whether other components interfere (or fit correctly) by examining standard sketch or section views.

Moreover, where parts and curvatures are complex, it's often beneficial to be able to create a series of slices through a set of parts at specific intervals. For example, such functionality is important in the design of products where the curvature and/or profile of the 3D product at multiple positions needs to be analyzed or communicated (e.g., a boat hull design). This, again, helps designers and fabricators understand how the elements of a design fit together and work.

Section cuts, which typically show the elements both at, and behind cut elements, fail to provide sufficient clarity for complex parts. What is needed is a tool for creating zero-depth slice views and allowing multiple slices to be juxtaposed simultaneously. These problems may be better understood with a detailed description of prior art section cuts.

FIGS. 1A, 1B, and 1C illustrate a prior art section view. FIG. 1A illustrates a section line and FIG. 1B illustrates the resulting section view. The user has created section A-A to show how a jig clamp 102 interacts with a B-pillar component 104. The section line A-A is drawn so it passes through the center of the contact point between the clamp 102 and the B-pillar 104. The context options for the section view are set so that the components of the clamp 102 are not sectioned but the B-pillar 104 is sectioned. Since the section view (i.e., FIG. 1B) shows component surfaces and edges behind the section line it is difficult to distinguish the portion of the B-pillar 104 that is contacted by the clamp 102 (see area 106).

As illustrated in FIG. 1C, in the prior art, the user could potentially take the time to individually hide the edges that are behind the section line A-A. However, such a practice would be very inefficient and the user may accidentally hide critical edges.

Accordingly, what is needed is the capability to display the geometry of a selected component along a particular cut plane(s).

SUMMARY OF THE INVENTION

Users desire the ability to show portions of drawing views as a "slice" or zero-depth section. Such a slice view is useful in industries where companies design machines to handle or interact with the products of other companies. In assembly drawings, users often want to show a section view or projection view details of their product but only show the slice of their customer's product or vice versa. Further, such functionality is important in the design of products where the curvature and/or profile of the 3D product at multiple positions needs to be analyzed or communicated.

One or more embodiments of the invention provide the ability to define and display a slice on an existing drawing view or on-the-fly dynamically during creation of a section view. A slice of a component is defined as a creating a zero-depth cut. The output of a slice produces a sheet body that is of zero-depth or in other words produces a cross-section of the component being sliced.

One or more embodiments of the invention provide a slice tool that enables the user to define multiple open profile sketches as slice lines of a three-dimensional body. Each slice line represents a slice cutting surface of the 3D body. A single slice view of the 3D body is displayed that simultaneously depicts all of the slice cutting surfaces with a zero-depth representation of each slice. The zero-depth representations reflect intersections between the 3D body and the slice cutting surface.

BRIEF DESCRIPTION OF THE DRAWINGS

Referring now to the drawings in which like reference numbers represent corresponding parts throughout:

FIGS. 1A, 1B, and 1C illustrate a prior art section view;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability for a user to define a location of a zero-depth series of multiple slices that can be placed at any location/interval the user desires in one view of a three-dimensional model that is reflected and displayed in a second view. Advantages/requirements of slice functionality may include: any view can be sliced, all components in a view can be sliced (including surface bodies) (except wire bodies which could produce an invalid point), slice sketches may be required to be open, slice sketches cannot be closed or self-intersecting, slice sketches can be of any geometry type (line, arc, circle, ellipse, spline, etc.), the resulting sliced component may be hatched, the resulting sliced view can be dimensioned, slice sketches cannot be sliced or cut again, slice sketches can be projected to create other projected views, and slice views can be shaded.

Hardware Environment

Figure 2:
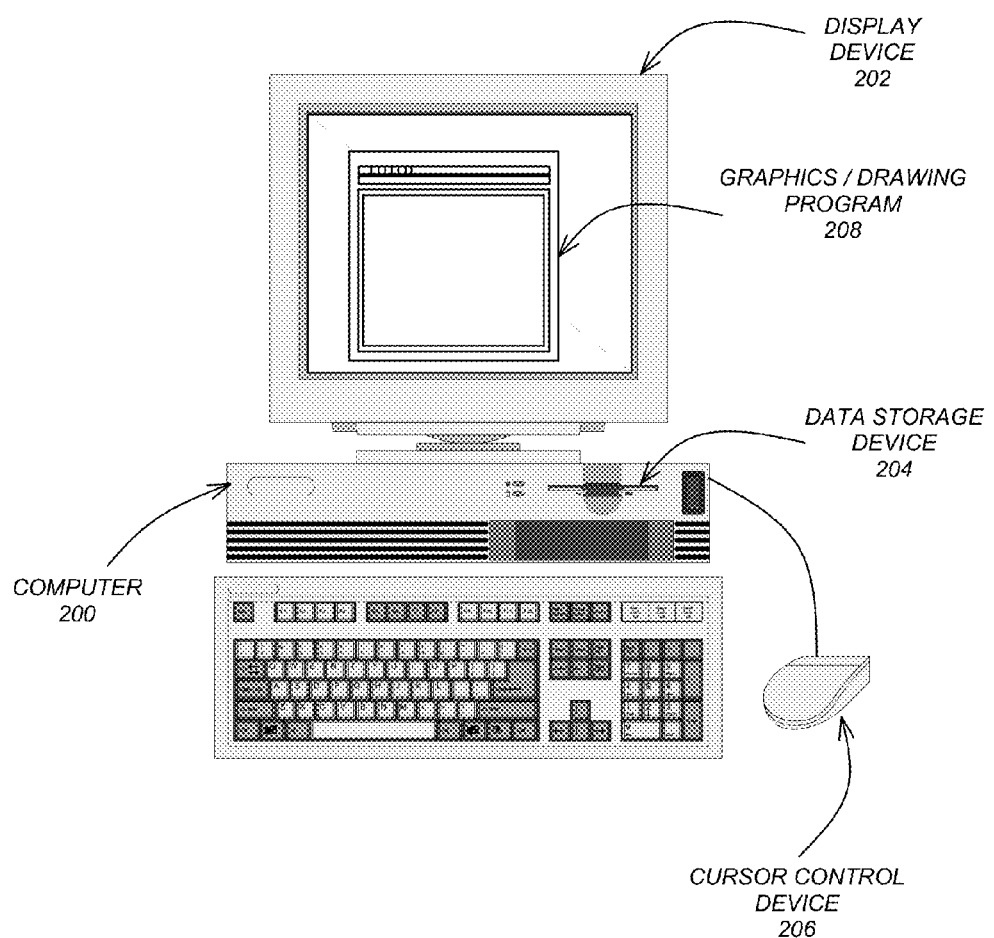
FIG. 2 is an exemplary hardware and software environment used to implement one or more embodiments of the invention.

FIG. 2 is an exemplary hardware and software environment used to implement one or more embodiments of the invention. Embodiments of the invention are typically implemented using a computer 200, which generally includes, inter alia, a display device 202, data storage devices 204, cursor control devices 206 (e.g., a mouse, stylus, etc.), and other devices. Those skilled in the art will recognize that any combination of the above components, or any number of different components, peripherals, and other devices, may be used with the computer 200.

One or more embodiments of the invention are implemented by a computer-implemented graphics program 208, wherein the graphics program 208 is represented by a window displayed on the display device 202. Generally, the graphics program 208 comprises logic and/or data embodied in or readable from a device, e.g., one or more fixed and/or removable data storage devices 204 connected directly or indirectly to the computer 200, one or more remote devices coupled to the computer 200 via a data communications device, etc.

In one or more embodiments, instructions implementing the graphics program 208 are tangibly embodied in a computer-readable medium, e.g., data storage device 204, which could include one or more fixed or removable data storage devices, such as a zip drive, floppy disc drive, hard drive, CD-ROM drive, tape drive, etc. Further, the graphics program 208 is comprised of instructions which, when read and executed by the computer 200, causes the computer 200 to perform the steps necessary to implement and/or use the present invention. Graphics program 208 and/or operating instructions may also be tangibly embodied in a memory and/or data communications devices of computer 200, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 2 is not intended to limit the present invention. Indeed, those skilled in the art will recognize that other alternative environments may be used without departing from the scope of the present invention.

Computer-Implemented Graphics Program

Figure 3:
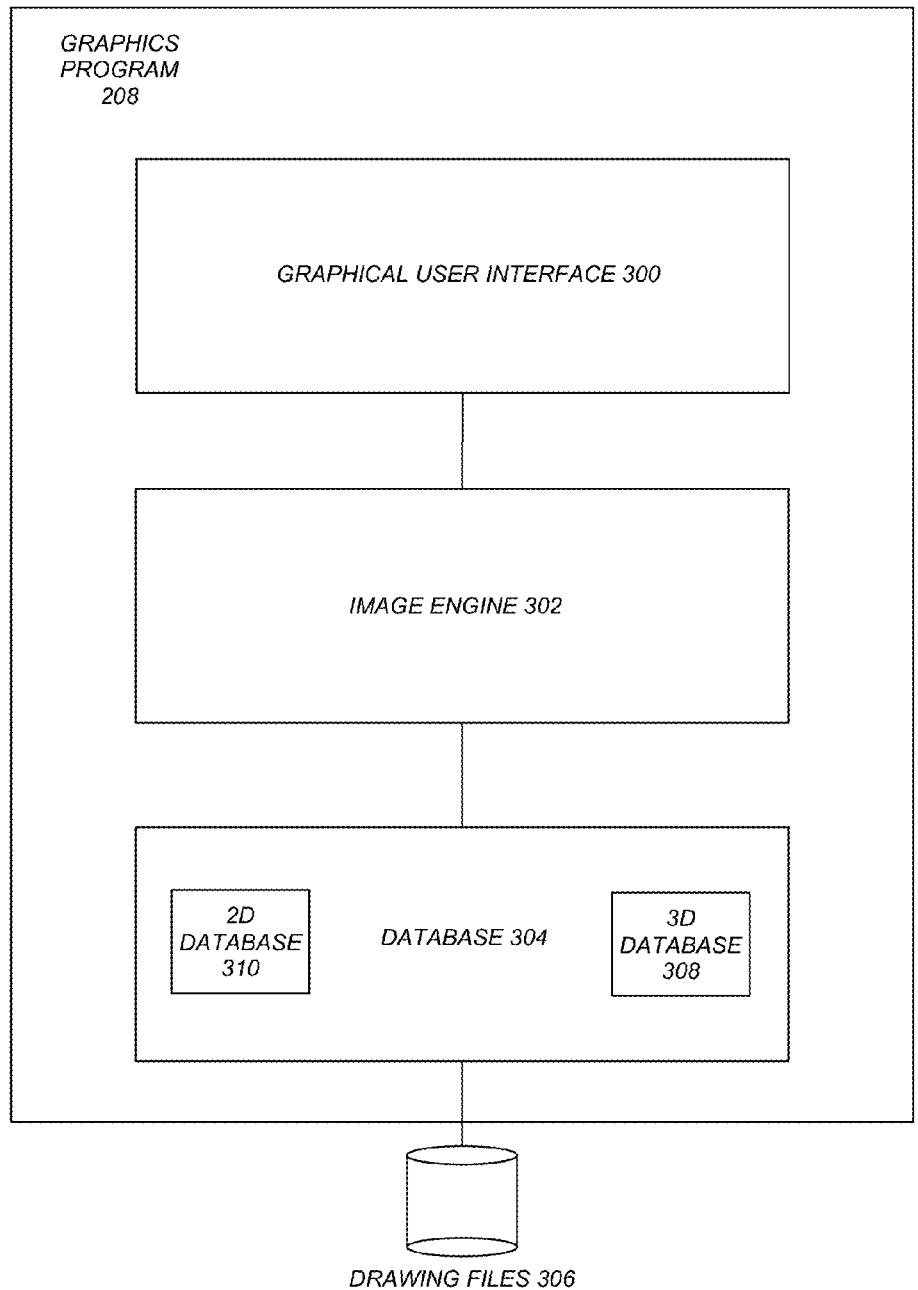
FIG. 3 is a block diagram that illustrates the components of a graphics program in accordance with one or more embodiments of the invention.

FIG. 3 is a block diagram that illustrates the components of the graphics program 208 in accordance with one or more embodiments of the invention. There are three main components to the graphics program 208, including: a Graphical User Interface (GUI) 300, an Image Engine (IME) 302, and a DataBase (DB) 304 for storing objects in drawing files 306. Such drawing files 306 may be one of several file types including .IDW, .DWF, .DWG, .DXF, .BMP, .JPG, etc.

The Graphical User Interface 300 displays information to the operator and provides the functionality for the operator's interaction with the graphics program 208.

The Image Engine 302 processes the drawing files 306 and delivers the resulting graphics to the monitor 202 for display.

In one or more embodiments, the Image Engine 302 provides a complete application programming interface (API) that allows other computer programs to interface to the graphics program 208 as needed.

The Database 304 is comprised of two separate types of databases: (1) a 3D database 308 known as the "3D world space" that stores 3D information; and (2) one or more 2D databases 310 known as the "2D view ports" that stores 2D information derived from the 3D information.

Software Embodiments

The graphics program 208 of the invention may be utilized in a CAD application or a 3D solid modeling environment (e.g., AutoCAD™ or Inventor™ available from the assignee of the present invention). However, alternative drawing programs may also be utilized in accordance with embodiments of the invention.

As described above, users may desire the ability to show portions of drawing views as a "slice" or zero-depth section. Such a slice can be viewed as a modification or rendering of an existing view (and not the creation of a new view). For example, while creating a new section view, the user can modify the view to be a slice view on the fly (i.e., dynamically). One or more embodiments of the invention provide the ability to simultaneously display multiple slices in a single view. The pixels that are displayed in any one slice are determined based on the intersection of the outline of a selected (and participating) component with a slice plane/cutting surface (see details below).

Figure 1C:
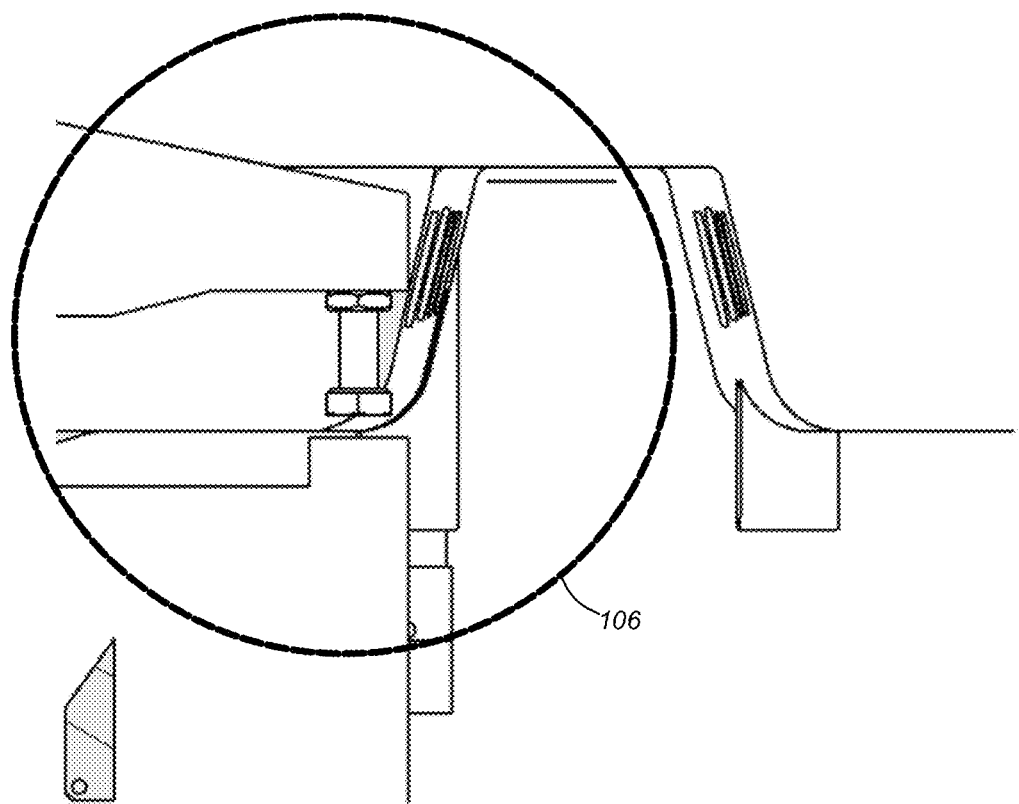

As the prior art illustrates in FIGS. 1A-1C, it is difficult to distinguish the portion of the B-pillar 104 that is contacted by the clamp 102. The user could take the time to individually hide the edges that are behind the section line but such action would be inefficient and may accidentally hide critical edges. Instead, in accordance with embodiments of the invention, the user can set various options (referred to as context options) for the B-pillar to "Slice", which automatically replaces the Section View of the B-pillar with the Slice.

Figure 4:
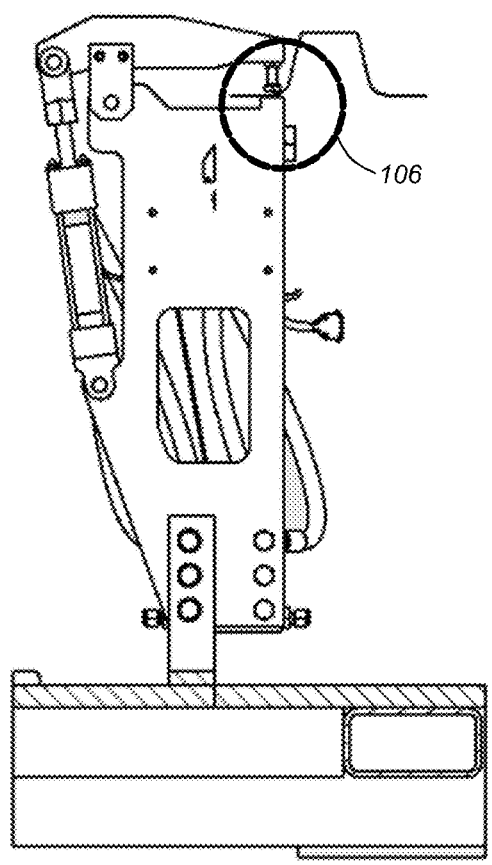
FIG. 4 illustrates the use of a slice of a clamp and B-pillar of FIG. 1A in accordance with one or more embodiments of the invention.

FIG. 4 illustrates the use of a slice of the clamp 102 and B-pillar 104 of FIG. 1A in accordance with one or more embodiments of the invention. As illustrated in area 106, the user can now more easily depict where the clamp 102 contacts the B-pillar 104. In FIG. 4, only the geometry of the B-pillar 104 that lies in the cut plane is displayed. Since the B-pillar 104 is actually a surface instead of a solid, the slice appears as a wireframe. Now the user can easily portray the relationship between the clamp 102 and the B-pillar 104 at the contact point with much greater clarity.

Figure 5:
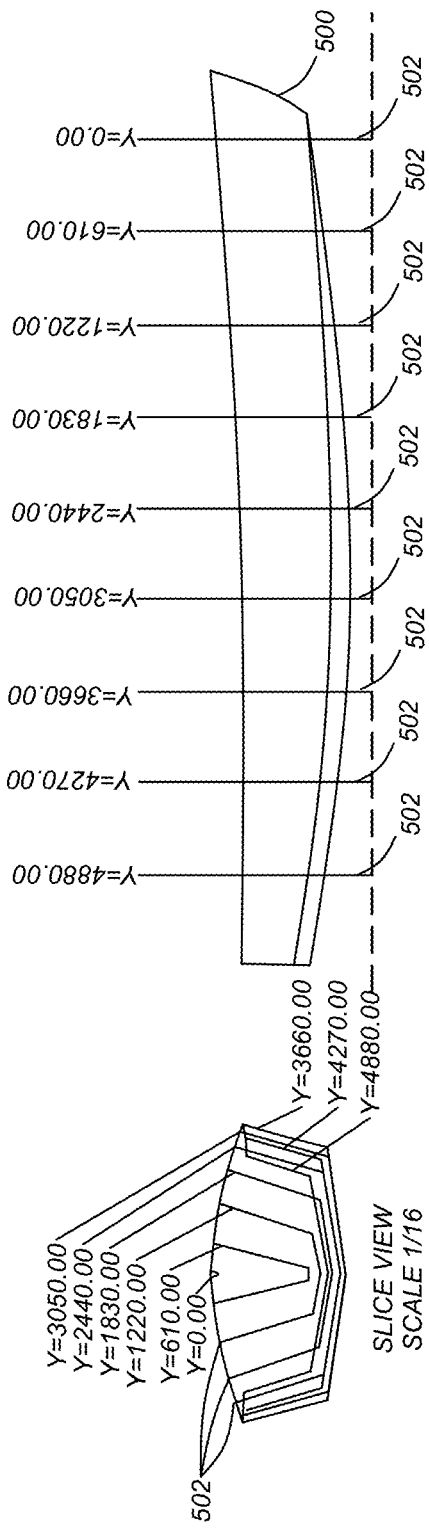
FIG. 5 illustrates two drawing views of a surface in accordance with one or more embodiments of the invention.

FIG. 5 illustrates two drawing views of a surface. On the right side of FIG. 5 is a side view of a boat hull 500. Nine (9) different slices 502 have been defined in the boat hull 500. The left side of FIG. 5 illustrates a front slice view illustrating all of the different slices 502 (only three of the nine slices are labeled).

Figure 6:
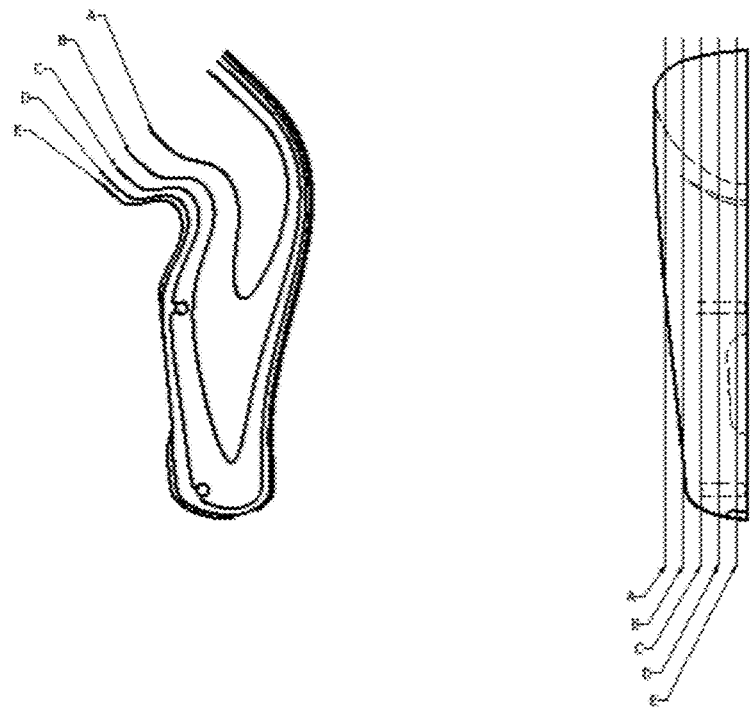
FIG. 6 illustrates two drawing views of a surface in accordance with one or more embodiments of the invention.

Similar to FIG. 5, FIG. 6 illustrates two drawing views of a surface in accordance with one or more embodiments of the invention. The images depict the outer surface of the left side housing of an electric shaver. The view on the right side of FIG. 6 is a side view of the housing that contains the sketch lines (A-E) representing the cutting planes/surfaces for the slice operation. The view on the left is the top view of the housing on which the Slice operation was performed. Each "contour line" in the left view represents the portion of the surface that each cutting plane/surface passes through.

The images depicted in FIGS. 5 and 6 (and the type of workflow represented therein) may be desirable when the user wants to analyze the size and shape of 3D geometry at different cross-sections without displaying the background geometry, which can make it difficult to distinguish the important geometry. As illustrated in FIG. 5, one industry where this may be very important is in the design of ship/boat hulls. Designers want to analyze the shape of the hull at different positions along the entire length. Further, embodiments of the invention may provide the ability to persist the labels (e.g., A-E of FIG. 6) with the drawing/slices and may (or may not) be displayed to enable the user to more accurately understand and view the different slices.

Figure 7A:
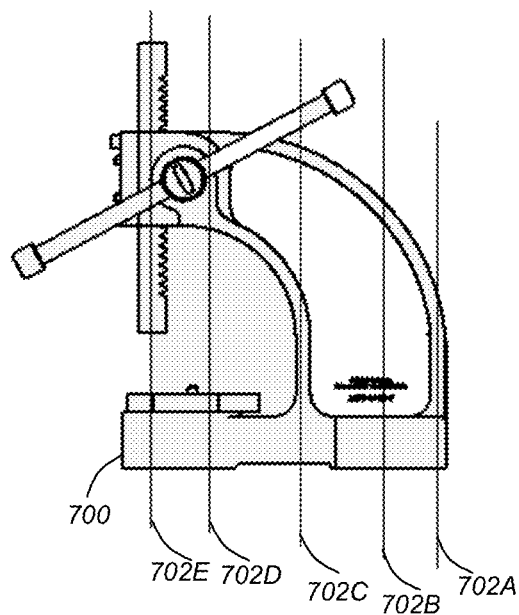
FIGS. 7A-7C also illustrate the use of a slice view in accordance with one or more embodiments of the invention.
Figure 7B:
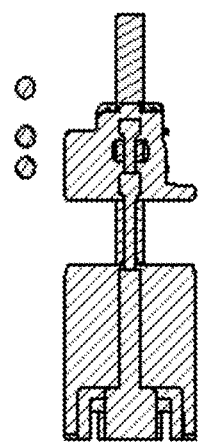
Figure 7C:
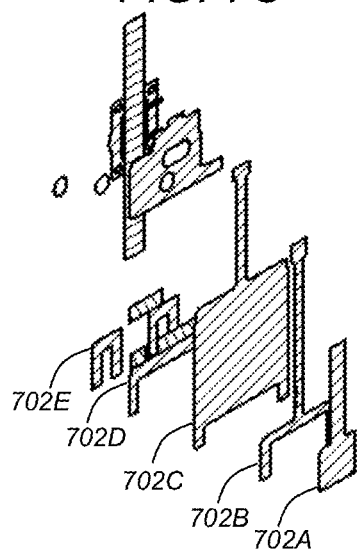

Similar to FIGS. 5 and 6, FIGS. 7A-7C also illustrate the use of a slice view in accordance with one or more embodiments of the invention. FIG. 7A illustrates a side view of a vice 700. Sketch lines 702A-E are used to define the slice planes/surfaces. FIG. 7B illustrates a right side view of the vice with a slice operation. As can be seen, each slice 702 is simultaneously displayed as a wireframe image (or as a zero-depth slice) of the vice 700. FIG. 7C is an isometric view of the slice operation. Each slice or slice plane/surface 702 can be seen in the isometric view of FIG. 7C. The distances between each slice plane/surface 702 reflect the distances between each sketch line defined in FIG. 7A.

Figure 8A:
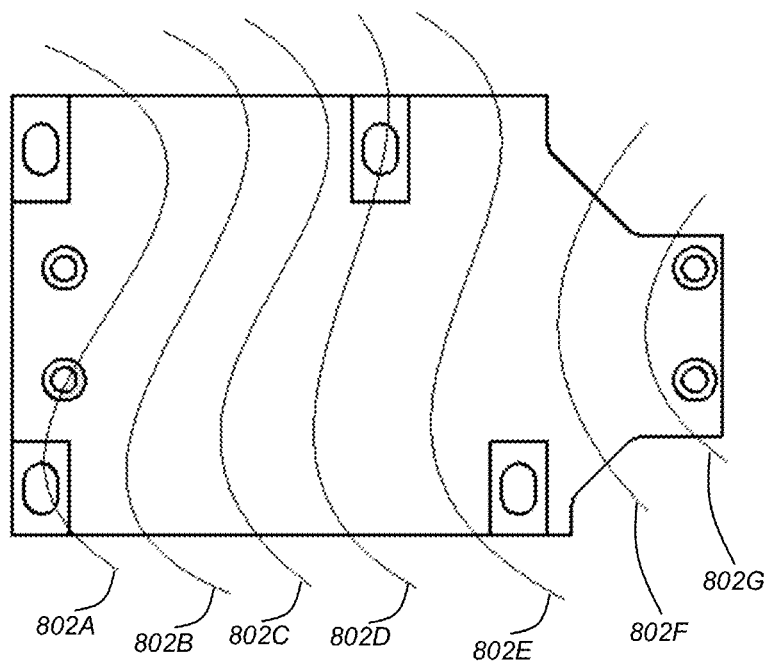
FIGS. 8A and 8B further illustrate a slice operation using different shape sketch lines and a resulting view in accordance with one or more embodiments of the invention.
Figure 8B:
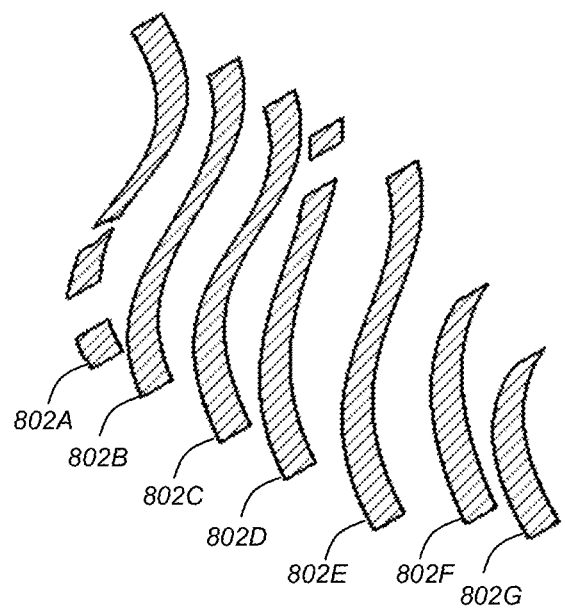

FIGS. 8A and 8B further illustrate a slice operation using different shape sketch lines and a resulting view in accordance with one or more embodiments of the invention. In FIG. 8A, the user has sketched different splines 802A-G that are used to define the slice planes/surfaces for the slice operation. FIG. 8B illustrates an isometric view of the slice operation with the ability to view each slice plane/surface 802A-G.

As illustrated in FIGS. 5-8, the user has the ability to define slice planes/surfaces at any interval desired. Embodiments may provide the ability to define slices on regularly spaced intervals (e.g., every twenty pixels or every three feet [scaled appropriately]). Alternatively, irregular intervals can be utilized (e.g., wherever the sketch is a spline or line (vertical or otherwise), or defined and based on a property of the object). For example, the user may specify that a slice should be taken whenever any selected object changes color, angle, shape, attribute, etc. In other words, the location of slices can be defined based on any sequence/series of properties desired.

In addition, the slice lines can be any shape. However, embodiments of the invention may require that the slice lines be open profile. An open profile slice line has a discreet start point and discreet end point where the start and end point don't meet. In other words, each slice line can either be a line or several line segments but the lines can't self intersect. For example, slice lines can be straight lines, curved lines, splines, arcs, ellipses, circles, an S, a half circle, etc. However, some embodiments may exclude the use of circles, rectangles, polygons, etc. as slice lines because they are not open profile or self-intersect.

In addition to the above, the user may also have the ability to determine which components of an assembly participate in a slice view. For example, suppose a 3D assembly having multiple parts is displayed. However, the user may desire to cut away the outside surface of the 3D assembly and display such a surface as a wireframe (i.e., a zero-depth slice) while retaining the 3D nature of the parts/components inside the 3D assembly (i.e., beneath the surface). The user can individually select all of the extraneous elements/parts and elect whether to include them in a slice operation or hide them.

A user interface option may also override any individual part settings and include all parts of an assembly in a slice operation. In other words, the user may opt to conduct a slice operation while slicing all parts in the assembly. Such a slice operation can potentially override any individual part settings and all components/parts in a view will be sliced according to the section line geometry. The slice operation is essentially a full zero-depth section view.

Further, solid assembly components/parts (that are sliced) may display cross hatching or any other graphic in the slice view. However, surface components that are sliced may not display any cross hatching since they may be represented by a wire frame only.

Embodiments of the invention further provide for automatically updating the slice view when subsequent to editing either the slice lines or the underlying body/surface. For example, if a user edits/updates a section line or a slice line, the slice operation or resulting slice view will be automatically updated to reflect such an update. Such automatic updating occurs in the slice view without additional user action/interaction. In other words, the graphics program 208 will update the slice view without the user manually having to update the slice operation or view. In this regard, the slice operation and underlying configuration of the slice operation is fully editable and fully parameteric. One can edit the geometry or a component or a slice line, and such edits are reflected in the slice operation/view. Further, one can edit whether a component of an assembly participates in a slice operation and such editing will also be automatically and dynamically reflected in the slice view/operation.

Logical Flow

Figure 9:
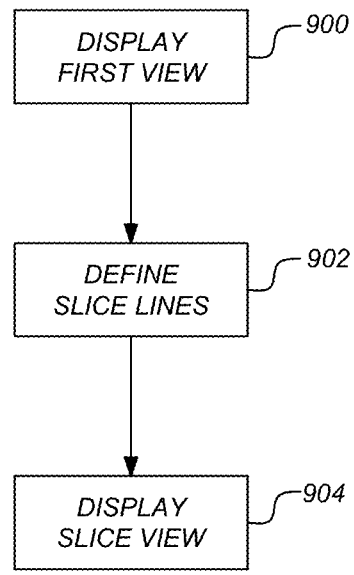
FIG. 9 illustrates the logical flow for displaying multiple slices of a three dimensional body in a computer drawing application in accordance with one or more embodiments of the invention.

FIG. 9 illustrates the logical flow for displaying multiple slices of a three-dimensional body in a computer drawing application in accordance with one or more embodiments of the invention. At step 900, a first view of the three dimensional body is displayed. Such a first view may be a front view, side view, or any other view/sketch desirable by the user. The three-dimensional body does not have to be a solid but can be any body or surface. Further, the system may display the 3D body as a result of an extrusion of a two-dimensional drawing (e.g., a sketch by a user). The view of the 3D body displayed at step 900 may also be referred to as creating a source view.

At step 902, one or more slice sketches/lines are defined on the first/source view. (In alternate embodiments, two or more slice sketches may be defined and subsequent steps reflect such multiple slice sketch definitions). Such slice sketches may be defined by sketch geometry or work geometry. For example, one (or multiple) piece(s) of work or sketch geometry being used in a single view can be used to create a (or multiple) section slices. With respect to sketch geometry, the user may draw the slice sketches (e.g., by drawing a line or a spline) onto the first view. With respect to work geometry, the slice sketches can be defined by accepting one or more planes/surfaces (e.g., work planes) in a model of the 3D body (or by projecting work planes into a sketch in the drawing). Alternatively, the user may specify a single point that is projected to create a line that can then be used as a slice plane. The slice sketches may also be open profile lines. Further, each of the slice sketches defines a slice cutting surface. In the case of a straight slice sketch, a slice plane may be defined. Alternatively, if the slice sketch is a spline, a curved cutting surface may be defined.

At step 904, a single slice view of the 3D body is displayed. Such a single slice view may also be referred to as a target view. The single slice/target view simultaneously depicts all of the one or more slices with a zero-depth representation of each slice. Such a view may depict each slice by displaying an outline of the 3D body where it intersects with each slice cutting surface. The slice view may also be displayed as an isometric view that illustrates a depth component between slices displayed based on a distance between each slice line defined in the first view.

As described above, at step 904, the 3D body or the slice sketches may be edited and the slice view is automatically (and dynamically) updated to reflect the editing. For example, the slice sketch can be moved in. In addition, the 3D body may be an assembly having multiple parts/components. A user can determine whether each of the multiple parts participates in the single slice view. If the part does not participate in the slice view, the first part is displayed in an original form of the first part (e.g., in a 3D model view). However, if the part participates in the slice view, a zero-depth representation of the part is displayed in the slice view. Thus, only components that have been tagged/identified for the slice operation will be sliced. Other components will be left alone and their participation in the view depends on their location in the view with respect to the slice sketch. Wire bodies may be discarded as slicing them may produce a degenerate body (point) which is invalid.

Embodiments of the invention may also provide the ability to utilize a slice tool. Such a slice tool allows the user to select the resulting target view (e.g., isometric, left front side, etc.) that the user desires a slice to appear in. The tool may then be used to sketch slice lines in the source view (that is different than the target view) to define the slice planes/surfaces. The user may then select the sketch that contains the slice lines and choose the various options (e.g., regarding whether a part/component participates in a slice) (e.g., to slice all parts or to utilize individual settings for parts/components of an assembly). Thereafter, the target view is displayed based on the defined slice lines and various options. Further, once all of the slice cutting surfaces have been defined in the source view, the user may opt to display a subset of such slice cutting surfaces in the target view.

In addition to the above, embodiments of the invention may allow both a slice and volume cut (section) operation to display at the same time. Accordingly, the user may slice components while executing a section view command. Such an operation provides for a variety of cuts where some components are "sectioned" (volume-cut), some components are "sliced" (zero-depth cut) and some components can be ignored. As described above, the user also has the ability to slice "all" components. In such an operation, the source view is created at step 900 followed by the selection of one or more components on the source view to be sectioned, sliced, or none. At step 902, a section/target view is created and the section line(s) are created (or pre-existing sketches are selected) as slice lines. The resulting slice view is displayed at step 904.

In addition, when slicing components, all bodies that are part of the component are processed. As part of the slice line defining at step 902, the user input sketches are analyzed and valid sketches are processed. The valid sketches (i.e., a 2D drawing) may then be extruded to create a sheet body (thereby resulting in a display of a 3D body) (that can contain one or more lumps). Alternatively, if a slice is requested during a section view command, a section tool body is created. During the section tool body creation, front faces (defined as the face that contains the user defined sketch curves) are identified, copied, and made into a slice sheet body.

The sheet body is examined and a determination is made regarding which parts/bodies (of the 3D body) can be cut. The bodies are subjected to a bounding box test that is essentially a box intersect test to determine if a slice tool bounding box (i.e., a slice plane/surface) intersects an input body bounding box (i.e., the extruded tool/sheet body). The bodies that pass this box-test are collected for a full Boolean intersection. In other words, a first pass is performed to eliminate those bodies outside of a certain region (i.e., those outside of the slice tool bounding box).

If the bounding boxes intersect, the full Boolean operation (i.e., intersection operation) may be performed between the slice plane/surface and the part. The points of intersection define the areas that will be displayed (i.e., define the zero-depth section of the sheet body). The naming of the various elements may also be performed to preserve the naming for later use by annotations (e.g., dimensions).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Further, in a network based environment, a client and server may be utilized to undertake/process different portions of claimed invention. For example, a drawing may be stored on a server and a client may define a slice (e.g., remotely) that is displayed by another client, the same client, or by the server.

In summary, embodiments of the invention provide the ability to create a zero-depth series of slices that can be placed at any location the user desires across one view that can be reflected in a second view.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of generating slices of a three-dimensional (3D) body in a 3D solid modeling application, comprising:
   acquiring, in a computer, the 3D body in the 3D solid modeling application, wherein the 3D body comprises a modeling assembly having multiple 3D parts;
   specifying whether each of the multiple 3D parts in the assembly participates in a single slice model representation and is included in a slice operation or does not participate in the simple slice model representation and is hidden in the single slice model representation;
   generating, in the computer in the 3D solid modeling application on the 3D body, one or more slice geometries, wherein each of the one or more slice geometries defines a respective slice cutting surface;
   based on, and for each of the one or more slice geometries, slicing, in the computer in the 3D solid modeling application, the 3D body through the surface of the 3D body, to create one or more respective zero-depth slices, wherein each zero-depth slice comprises an outline of the 3D body where it intersects with the respective slice cutting surface; and
   generating, in the computer, the single slice model representation that comprises a simultaneous representation of all of the one or more respective zero-depth slices;
   wherein:

if a first 3D part of the multiple 3D parts does not participate in the single slice model representation, the first 3D part is displayed in an original form of the first 3D part in the 3D solid modeling application and is hidden from display in the single slice model representation; and
if the first 3D part participates in the single slice model representation, a zero-depth representation of the first 3D part is displayed in the single slice model representation of the 3D body.

2. The method of claim 1, wherein:
the generating the one or more slice geometries, the slicing the 3D body through the surface of the 3D body, and the generating the single slice model representation, do not modify the 3D body;
the method further comprising:
modifying the 3D body in the solid modeling application; and
in response to the modifying, automatically and dynamically updating each of the zero-depth slices affected by the modifying.

3. The method of claim 1, wherein one of the one or more slice geometries is generated by the user drawing, in the 3D solid modeling application, a two-dimensional geometry on the 3D body.

4. The method of claim 1, wherein one of the one or more slice geometries is generated by accepting a plane of the 3D body as the slice geometry.

5. The method of claim 1, wherein one of the one or more slice geometries comprises an open-profile line.

6. The method of claim 1, wherein the single slice model representation comprises an isometric view that illustrates a depth component between each of the one or more respective zero-depth slices that reflects a distance between each slice geometry generated on the 3D body.

7. An apparatus for generating slices of a three-dimensional (3D) body in a 3D solid modeling application, comprising:
(a) a computer having a memory; and
(b) an 3D solid modeling application executing on the computer, wherein the 3D solid modeling application is configured to:
(1) acquire the 3D body, the 3D body comprises a modeling assembly having multiple 3D parts;
(2) specify whether each of the multiple 3D parts in the assembly participates in a single slice model representation and is included in a slice operation or does not participate in the single slide model representation and is hidden in the single slice model representation;
(3) generate, on the 3D body, one or more slice geometries, wherein each of the one or more slice geometries defines a respective slice cutting surface;
(4) based on, and for each of the one or more slice geometries, slice the 3D body through the surface of the 3D body, to create one or more respective zero-depth slices, wherein each zero-depth slice comprises an outline of the 3D body where it intersects with the respective slice cutting surface; and
(5) generate the single slice model representation that comprises a simultaneous representation of all of the one or more respective zero-depth slices; and
wherein:
if a first 3D part of the multiple 3D parts does not participate in the single slice model representation, the first 3D part is displayed in an original form of the first 3D part in the 3D solid modeling application and is hidden from display in the single slice model representation; and
if the first 3D part participates in the single slice model representation, a zero-depth representation of the first 3D part is displayed in the single slice model representation of the 3D body.

8. The apparatus of claim 7, wherein:
the 3D solid modeling application does not modify the 3D body when generating the one or more slice geometries, slicing the 3D body through the surface of the 3D body, and generating the single slice model representation; and
the 3D solid modeling application is further configured to:
modify the 3D body; and
in response to the modifying, automatically and dynamically update each of the zero-depth slices affected by the modification.

9. The apparatus of claim 7, wherein one of the one or more slice geometries is generated by drawing, in the 3D solid modeling application, a two-dimensional geometry on the 3D body.

10. The apparatus of claim 7, wherein one of the one or more slice geometries is generated by accepting a plane of the 3D body as the slice geometry.

11. The apparatus of claim 7, wherein one of the one or more slice geometries comprises an open-profile line.

12. The apparatus of claim 7, wherein the single slice model representation comprises an isometric view that illustrates a depth component between each of the one or more respective zero-depth slices that reflects a distance between each slice geometry generated on the 3D body.

13. A computer program product comprising a data storage device readable by a computer and embodying one or more instructions executable by the computer to perform a method for generating slices of a three-dimensional (3D) body in a 3D solid modeling application, the method comprising:
acquiring the 3D body in the 3D solid modeling application, wherein the 3D body comprises an modeling assembly having multiple 3D parts;
specifying whether each of the multiple 3D parts in the assembly participates in a single slice model representation and is included in a slice operation or does not participate in the single slice model representation and is hidden in the single slice model representation;
generating, in the 3D solid modeling application on the 3D body, one or more slice geometries, wherein each of the one or more slice geometries defines a respective slice cutting surface;
based on, and for each of the one or more slice geometries, slicing, in the 3D solid modeling application, the 3D body through the surface of the 3D body, to create one or more respective zero-depth slices, wherein each zero-depth slice comprises an outline of the 3D body where it intersects with the respective slice cutting surface; and
generating the single slice model representation that comprises a simultaneous representation of all of the one or more respective zero-depth slices; and
wherein:
if a first 3D part of the multiple 3D parts does not participate in the single slice model representation, the first 3D part is displayed in an original form of the first 3D part in the 3D solid modeling application and is hidden from display in the single slice model representation; and if the first 3D part participates in the single slice model representation, a zero-depth representation of the first 3D part is displayed in the single slice model representation of the 3D body.

14. The computer program product of claim 13, wherein:
the generating the one or more slice geometries, the slicing the 3D body through the surface of the 3D body, and the generating the single slice model representation, do not modify the 3D body;
the method further comprising:
   modifying the 3D body in the solid modeling application; and
   in response to the modifying, automatically and dynamically updating each of the zero-depth slices affected by the modifying.

15. The computer program product of claim 13, wherein one of the one or more slice geometries is generated by the user drawing, in the 3D solid modeling application, a two-dimensional geometry on the 3D body.

16. The computer program product of claim 13, wherein one of the one or more slice geometries is generated by accepting a plane of the 3D body as the slice geometry.

17. The computer program product of claim 13, wherein one of the one or more slice geometries comprises an open-profile line.

18. The computer program product of claim 13, wherein the single slice model representation comprises an isometric view that illustrates a depth component between each of the one or more respective zero-depth slices that reflects a distance between each slice geometry generated on the 3D body.

* * * * *